May 1, 1923.

J. M. LABBERTON

GEAR TOOTH

Filed Nov. 6, 1919

WITNESSES:
T. Shelhamer
K. M. Biebel

INVENTOR
John M. Labberton
BY
Chesley Carr
ATTORNEY

Patented May 1, 1923.

1,453,395

UNITED STATES PATENT OFFICE.

JOHN M. LABBERTON, OF WILKINSBURG, PENNYSLVANIA, ASSIGNOR TO WESTINGHOUSE ELECTRIC & MANUFACTURING COMPANY, A CORPORATION OF PENNSYLVANIA.

GEAR TOOTH.

Application filed November 6, 1919. Serial No. 336,069.

*To all whom it may concern:*

Be it known that I, JOHN M. LABBERTON, a citizen of the United States, and a resident of Wilkinsburg, in the county of Allegheny and State of Pennsylvania, have invented a new and useful Improvement in Gear Teeth, of which the following is a specification.

My invention relates to gear teeth as employed on gears and racks and it has for its object to provide involute teeth that shall be stronger than those commonly employed at present and that shall further mesh with adequate clearance, with a substantially uniform percentage of rolling and with an optimum pressure angle, irrespective of the gear ratio employed.

Heretofore, a constant pressure angle has been used in the design of gear teeth of the involute form over the entire range of gear ratios and of gear wheel diameters. In the case of a pinion having a relatively small number of teeth meshing with a gear wheel having a large number of teeth, the form of the teeth in both wheels must be modified in order to permit the gear and the pinion to operate properly without interference. The amount of rolling between co-operating gear teeth will vary with the gear ratio used, with the result that a gear or a pinion which may operate properly and with relatively small wear in one application will be subjected to much greater wear in another application. The addendum and the dedendum of the gear teeth have been made substantially equal save for a small amount of clearance at the root of the tooth, resulting in the thickness of the teeth of both the pinion and the gear at the pitch circle being the same and, consequently, of relatively different strengths.

In practicing my invention, I provide a modified form of involute tooth for co-operating gear wheels, based upon a mathematical analysis of the elements entering into the problem of meshing gear teeth. Having once made this analysis and having derived several relatively simple formulæ, I am able, by their use, to calculate the proper constants to be used in laying out the tooth form. The data usually available when laying out the form of teeth for a set of co-operating gear wheels includes the gear ratio, the gear center distance and the desired diametral pitch. By the use of the above-mentioned formulæ embodying my method, I calculate the pressure angle, the addendum and the dedendum of the teeth and the relative tooth thickness at the pitch circle, and may then proceed to lay out the tooth form for the particular application.

Figure 1:
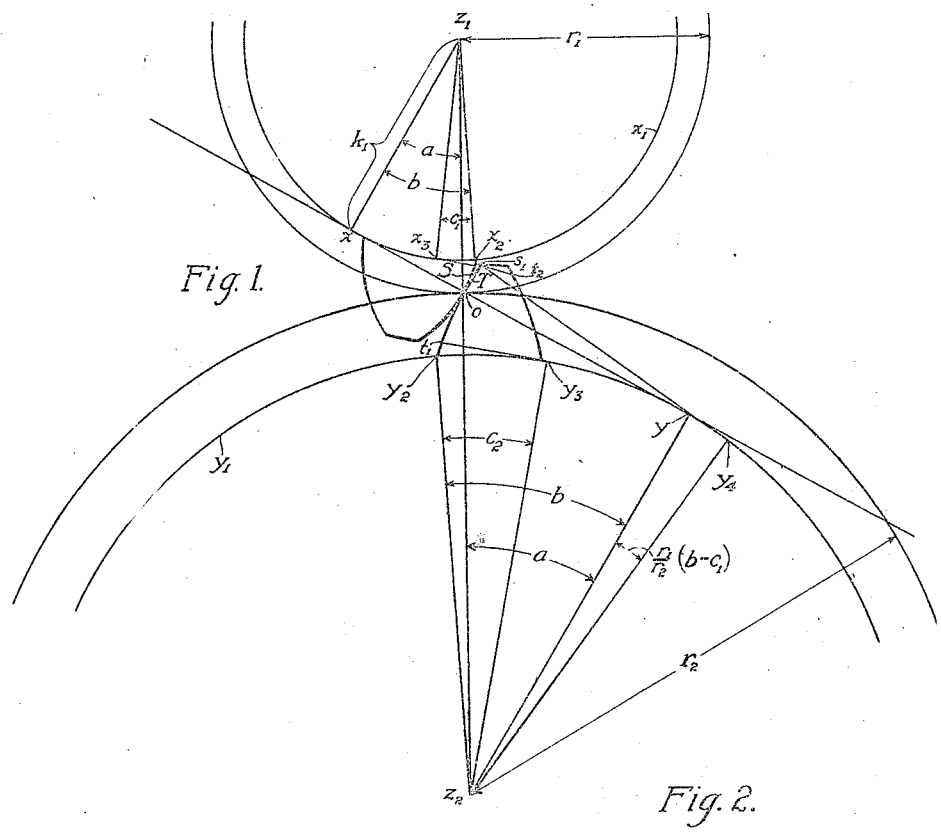
Figure 2:
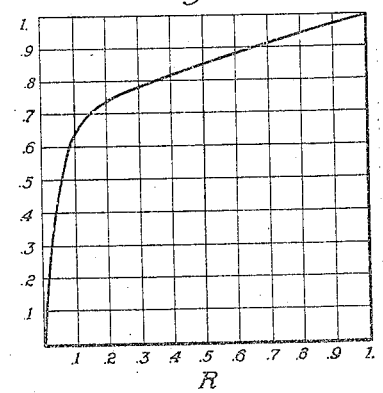

Referring to the drawings, Figure 1 is a diagram showing two co-operating teeth of a spur pinion and gear, together with certain other details which will be used in the mathematical analysis of the problem, and Fig. 2 is a curve showing the ratio of the thicknesses of the teeth of the #1 and #2 gear wheels at the pitch circle as a function of the gear ratio.

Turning now to the specific details of my invention,

Let $r_1$ = radius of pitch circle of the #1 gear wheel.
$r_2$ = radius of pitch circle of the #2 gear wheel.
$k_1$ = radius of base circle of the #1 gear wheel.
$k_2$ = radius of base circle of the #2 gear wheel.
$q_1$ = No. of teeth of the #1 gear wheel.
$q_2$ = No. of teeth of the #2 gear wheel.
$a$ = pressure angle.
S = involute curve representing one side of #1 gear wheel tooth drawn from base circle of #1 gear wheel.
T = involute curve representing co-operating side of #2 gear wheel drawn from base circle of #2 gear wheel.
$xx_1$ represent the base circle of the #1 gear wheel.
$yy_1$ represent the base circle of the #2 gear wheel.
$z_1$ represent the center of the #1 gear wheel.
$z_2$ represent the center of the #2 gear wheel.
$z_1z_2$ represent the line joining the gear centers.
$o$ represent the point at which the line $z_1z_2$ intersects the pitch circles of the two gear wheels.
$xy$ represent the line of pressure of the co-operating gear teeth drawn as a tangent to the two base circles $xx_1$ and $yy_1$.

For the purposes of our analysis, the two curves S and T, representing the co-operating gear teeth surfaces, are assumed to pass through the point $o$.

Draw the lines $z_1x$ and $z_2y$ from the respective gear wheel centers at right angles to the line $xy$.

The angles $oz_1x$ and $oz_2y$ are equal and may be designated by the letter $a$. The involute S will meet its base circle $xx_1$ at a point $x_2$, and the involute T will meet its base circle $yy_1$ at a point $y_2$.

Draw the lines $z_1x_2$ and $z_2y_2$ and by the construction the angle $xz_1x_2$ will be equal to $y_2z_2y$ and may be designated by $b$.

Let $s_1$ represent a point on the curve S at which the tip of the curve T of the co-operating tooth will first make contact under operating conditions. The evolute of the involute curve $x_2S_1$ will be the arc $x_3x_2$ and we may designate the angle $x_3z_1x_2$ by $c_1$.

Let $t_1$ represent a point on the curve T at which the tip of the curve S of the co-operating tooth will last make contact under operating conditions. The arc $y_2y_3$ will be the evolute of the involute curve $y_2t_1$ and we may designate the angle $y_2z_2y_3$ by $c_2$.

The length of the line $xo = r_1 \sin a$.

The length of the involute $$x_2o = \frac{k_1b'}{2} \text{ (by calculus)}$$

The length of the line $z_1x = k_1 = r_1 \cos a$.
The angle $b$ (in radians)

$$= \frac{xo}{z_1x} = \frac{r_1 \sin a}{k_1} = \frac{r_1 \sin a}{r_1 \cos a}$$

Therefore, the angle $b$ (in radians) $= \tan a$ (1)

Therefore, $\dfrac{k_1b^2}{2} = \dfrac{r_1 \cos a \tan^2 a}{2}$

Consider the section $s_1o$ of the involute generated by the evolute of the arc $xx_3$ of the angle $xz_1x_3$, which is equal to $(b-c_1)$ $$s_1o = \frac{k_1b^2}{2} - \frac{k_1c_1^2}{2} = \frac{k_1}{2}(b^2 - c_1^2)$$

If it is assumed that the #1 gear wheel rotates through $(b-c_1)$ radians, the tooth contact surface S is always perpendicular to the line of pressure $xy$.

If the #1 gear wheel rotates through $(b-c_1)$ radians, the #2 gear wheel will correspondingly rotate through $$\frac{r_1}{r_2}(b-c_1)$$

radians and a portion of the contact surface T on the co-operating tooth of the #2 gear wheel must mate with the section S. Let this co-operating surface be that part of T between the parts $o$ and $t_2$.

The angle $yz_2y_4 = \dfrac{r_1}{r_2}(b-c_1)$.

The angle $y_2z_2y_4 = b + \dfrac{r_1}{r_2}(b-c_1)$

The length of the co-operating surface $t_2o$ is, from the drawing $$= \left\{ \frac{k_2\left[b + \dfrac{r_1}{r_2}(b-c_1)\right]^2}{2} - \frac{k_2b^2}{2} \right\}$$

The proportion of the surface T on which rolling of the two co-operating tooth surfaces occurs is $$\frac{s_1o}{t_2o},$$

sliding of the two surfaces occurring over the remainder thereof. Let this ratio $$\frac{s_1o}{t_2o}$$

be represented by K.

$$\frac{s_1o}{t_2o} = \frac{\dfrac{k_1}{2}(b^2 - c_1^2)}{\dfrac{k_2}{2}\left[b + \dfrac{r_1}{r_2}(b-c_1)\right]^2 - \dfrac{k_2b^2}{2}}$$

and by substituting the ratio of $r_1$ and $r_2$ for $k_1$ and $k_2$ and expanding we get $$K = \frac{r_1}{r_2}\left[\frac{b^2 - c_1^2}{b^2 + 2b\dfrac{r_1}{r_2}(b-c_1) + \left(\dfrac{r_1}{r_2}\right)^2(b-c_1)^2 - b^2}\right]$$

Simplifying $$K = \frac{r_1}{r_2}\left[\frac{(b-c_1)(b+c_1)}{\dfrac{r_1}{r_2}(b-c_1)\left(2b + \dfrac{r_1}{r_2}[b-c_1]\right)}\right]$$

$$K = \left[\frac{b+c_1}{2b + \dfrac{r_1}{r_2}(b-c_1)}\right]$$

An inspection of the above equation shows that the rolling is a maximum when $b = c_1$, but this is a condition impossible to realize with gear teeth, as S and T would then equal zero and we would have the theoretical condition of two co-operating gear wheels, without teeth, i. e., two cylindrical surfaces having frictional driving engagement. The designer must therefore decide what amount of rolling is desired or what amount will give the best operating results, and it may be noted that K will be a number less than unity.

If we represent the ratio $\dfrac{r_1}{r_2}$ by R and substitute in the above formula we get $$K = \frac{b+c_1}{2b + R(b-c_1)}$$

$$2bK + KR(b-c_1) = b + c_1$$

$$2bK + RKb - RKc_1 = b + c_1$$

$$b(2K + RK - 1) = c_1(1 + RK)$$

$$c_1 = \left[\frac{K(2+R) - 1}{1 + RK}\right]b \quad (2)$$

and in a similar manner we may obtain $$c_2 = \left[\frac{K\left(2+\frac{1}{R}\right)-1}{1+\frac{K}{R}}\right] b \quad (3)$$

The perimeter of the pitch circle of the #1 gear wheel $= 2\pi r_1$.

The arc per tooth of the #1 gear wheel
$$= \frac{2\pi r_1}{g_1}.$$

Let $\frac{2\pi r_1}{2g_1} = \frac{\pi r_1}{g_1}$ = the length of contact surface on the tooth face.

This is also equal to $\frac{\pi r_2}{g_2}$.

The length of contact surface $t_1 t_2$ of the tooth from the drawing $$\frac{\pi r_2}{g_2} = \frac{k_2 b^2}{2} - \frac{k_2 c_2^2}{2} + \frac{k_2}{2}\left[\left\{b+\frac{r_1}{r_2}(b-c_1)\right\}^2 - b^2\right]$$

$$= \frac{k_2}{2}\left[b^2 - c_2^2 + \{b+R(b-c_1)\}^2 - b^2\right]$$

$$\frac{\pi r_2}{g_2} = \frac{k_2}{2}\left[\{b+R(b-c_1)\}^2 - c_2^2\right]$$

and as $k_2 = r_2 \cos a$ $$\frac{\pi r_2}{g_2} = \frac{r_2 \cos a}{2}\left[\{b+R(b-c_1)\}^2 - c_2^2\right]$$

$$\frac{\pi}{g_2} = \frac{\cos a}{2}\left[\{b+R(b-c_1)\}^2 - c_2^2\right] \quad (4)$$

It may be noted that the angle of action for the #1 gear wheel
$$= b - c_1 + \frac{b-c_2}{R}$$

and for the #2 gear wheel
$$= b - c_2 + R(b-c_1)$$

The angle of action for the respective gear wheels should be not less than the angle subtended by one tooth pitch.

The addendum for the #2 gear wheel tooth may be determined by reference to Fig. 1, by solving for the length of line $z_2 t_2$ (not shown).

The length of line $t_2 y_4 = k_2 [b + R(b-c_1)]$
The length of line $z_2 y_4 = k_2$
The length of line $z_2 t_2 = \sqrt{k_2^2[b+R(b-c_1)]^2 + k_2^2}$ The addendum is $z_2 t_2 - r_2$
Therefore the addendum of #2 gear wheel tooth $$= \sqrt{k_2^2[b+R(b-c_1)]^2 + k_2^2} - r_2 \quad (5)$$

Similarly, the addendum for the #1 gear wheel tooth $$= \sqrt{k_1^2\left(b+\frac{b-c_2}{R}\right)^2 + k_1^2} - r_1 \quad (6)$$

Fig. 2 shows a curve representing the relative thicknesses of the teeth of the #1 and #2 gear wheels at the pitch line as a function of the gear ratio R. This curve was determined by using the above formulæ to calculate certain dimensions of the gear teeth and then by so proportioning the pitch-line thicknesses of the #1 and #2 gear wheel teeth as to make them of substantially equal calculated strength.

For the purpose of illustrating the use of the above method and of the formulæ, it may be assumed that it is desired to lay out a tooth form for a pair of co-operating spur gear wheels having a given distance between gear centers, the diametral pitch being known, as is also the desired gear ratio. Select a value of K (percentage of rolling) somewhat lower than unity. Calculate $c_1$ and $c_2$ by using the formulæ (2) and (3).

Then substitute these values in formula (4) and solve for "$a$" the pressure angle, noting that $b = \tan a$ from formula (1).

Then determine the addenda for the respective gear wheels, using formulæ (5) and (6), and allow the usual clearance at the root of the teeth. By reference to the curve of Fig. 2, the relative thicknesses of the teeth of the two gear wheels at the pitch circle may be determined.

We now have the pressure angle, the addenda for the teeth of the respective gear wheels, and the tooth thicknesses at the pitch line, and we may proceed to lay out the teeth of the two gear wheels.

While I have illustrated the use of my method for determining the dimensions of the teeth of spur gear wheels, it may be used also for bevel gear wheels and for helical gear teeth.

By the use of the above disclosed method embodying my invention, I provide a gear tooth, the pressure angle of which varies not only with the gear ratio but also with the number of teeth in the respective gear wheels. By inspection of the formulæ, it may be noted that the pressure angle is larger for the higher gear ratios, which will tend to reduce interference between the co-operating teeth. The location of the points of initial and of final contact between co-operating teeth is a function of the amount of rolling action and of the gear ratio and, as the values of $c_1$ and $c_2$ can never be zero, (see Formulæ 2 and 3) each of these two points will always be outside of the base circle of its own gear, and hence, there can be no interference. The addenda of the respective teeth are different, in order to secure a better percentage of rolling, the strength of the teeth in co-operating gear wheels being balanced by the adjustment of the pitch line thickness of the respective teeth. By proportioning the pitch-line thicknesses of the teeth of the #1 and #2 gear wheels in accordance with the curve shown in Fig. 2, the teeth in the two gear wheels may be made substantially equal in strength. The rolling action is substantially the same for all gear ratios and for all numbers of teeth in the respective gear wheels. The teeth may be cut by the use of a hob in substantially the same manner as is done for the present standard involute form of tooth.

While I have disclosed one method embodying my invention, various changes may be made therein without departing from the spirit and scope thereof and I desire that only such limitations shall be placed thereon as are imposed by the prior art or are specifically set forth in the appended claims.

I claim as my invention:

1. The method of determining the pressure angle of a pair of co-operating gear wheels having involute teeth, when the gear center distance, the gear ratio and the diametral pitch are known, which comprises the selection of a numerical value for the percentage of rolling action between co-operating teeth, which value is less than unity, calculating the values $c_1$ and $c_2$ in terms of $b$ from the formulæ

$$c_1 = \left[\frac{K(2+R)-1}{1+RK}\right]b$$

$$c_2 = \left[\frac{K\left(2+\frac{1}{R}\right)-1}{1+\frac{K}{R}}\right]b$$

wherein K represents the assumed numerical value of rolling action and R = gear ratio which is equal to or less than unity, substituting the values of $c_1$ and $c_2$ in the formula $$\frac{\pi}{g_2} = \frac{\cos a}{2}\left[\{b+R(b-c_1)\}^2 - c_2^2\right]$$

where
$q_2$ = number of teeth in larger gear wheel,
$b$ = tan $a$ and
$a$ = pressure angle
and then solving for $a$.

2. The method of determining the pressure angle and addenda of a pair of co-operating gear wheels having involute teeth, when the gear center distance, the gear ratio and the diametral pitch are known, which comprises the selection of a numerical value for the percentage of rolling action between co-operating teeth, which value is less than unity, calculating the values $c_1$ and $c_2$ in terms of $b$ from the formulæ

$$c_1 = \left[\frac{K(2+R)-1}{1+RK}\right]b$$

$$c_2 = \left[\frac{K\left(2+\frac{1}{R}\right)-1}{1+\frac{K}{R}}\right]b$$

wherein K represents the assumed numerical value of rolling action and R = gear ratio which is equal to or less than unity, substituting the values of $c_1$ and $c_2$ in the formula $$\frac{\pi}{g_2} = \frac{\cos a}{2}\left[\{b+R(b-c_1)\}^2 - c_2^2\right]$$

where
$q_2$ = number of teeth in larger gear wheel,
$b$ = tan $a$ and
$a$ = pressure angle,
and then solving for $a$; in calculating the addendum of the teeth of the larger gear wheel by formula: addendum of larger gear wheel teeth $$= \sqrt{k_2^2\left[b+R(b-c_1)\right]^2 + k_2^2} - r_2$$

wherein
$k_2$ = radius of the base circle of the larger gear wheel
and
$r_2$ = radius of the pitch circle of the larger gear wheel;
and calculating the addendum of the teeth of the smaller gear wheel by formula: addendum of smaller gear wheel teeth $$= \sqrt{k_1^2\left(b+\left(\frac{b-c_2}{R}\right)\right)^2 + k_1^2} - r_1$$

wherein
$k_1$ = radius of the base circle of the smaller gear wheel
and
$r_1$ = radius of the pitch circle of the smaller gear wheel.

In testimony whereof, I have hereunto subscribed my name this 3rd day of Nov. 1919.

JOHN M. LABBERTON.